US007976768B2

(12) United States Patent
Brady et al.

(10) Patent No.: US 7,976,768 B2
(45) Date of Patent: Jul. 12, 2011

(54) ALUMINUM TITANATE CERAMIC FORMING BATCH MIXTURES AND GREEN BODIES INCLUDING PORE FORMER COMBINATIONS AND METHODS OF MANUFACTURING AND FIRING SAME

(75) Inventors: Michael Donavon Brady, Painted Post, NY (US); Thomas James Deneka, Painted Post, NY (US); Steven Bolaji Ogunwumi, Painted Post, NY (US); Paul John Shustack, Elmira, NY (US); David Lambie Tennent, Campbell, NY (US); Patrick David Tepesch, Corning, NY (US); Jianguo Wang, Horseheads, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 512 days.

(21) Appl. No.: 11/445,024

(22) Filed: May 31, 2006

(65) Prior Publication Data

US 2007/0006561 A1  Jan. 11, 2007

Related U.S. Application Data

(60) Provisional application No. 60/686,117, filed on May 31, 2005.

(51) Int. Cl.
*B28B 3/20* (2006.01)
(52) U.S. Cl. ........................................ 264/630; 264/631
(58) Field of Classification Search .................. 264/630, 264/631
See application file for complete search history.

(56) References Cited

U.S. PATENT DOCUMENTS

| 4,327,188 | A | | 4/1982 | Endo et al. ..................... 501/134 |
| 5,137,789 | A | | 8/1992 | Kaushal ........................ 428/472 |
| 5,153,153 | A | | 10/1992 | Freudenberg et al. ........ 501/127 |
| 5,219,802 | A | | 6/1993 | Hsiao et al. .................... 501/81 |
| 5,256,347 | A | * | 10/1993 | Miyahara ..................... 264/40.6 |
| 5,262,102 | A | | 11/1993 | Wada .............................. 264/66 |
| 5,846,276 | A | | 12/1998 | Nagai et al. .................... 55/523 |
| 6,027,684 | A | * | 2/2000 | Gheorghiu et al. ............ 264/631 |
| 6,048,490 | A | | 4/2000 | Cornelius et al. ............. 264/631 |
| 6,099,793 | A | * | 8/2000 | Dull et al. ..................... 264/631 |
| 6,200,517 | B1 | | 3/2001 | Peng et al. .................... 264/630 |
| 6,210,626 | B1 | | 4/2001 | Cornelius et al. ............. 264/631 |
| 6,287,509 | B1 | * | 9/2001 | Gheorghiu .................... 264/630 |
| 6,287,510 | B1 | | 9/2001 | Xun .............................. 264/630 |
| 6,344,078 | B1 | * | 2/2002 | Beall et al. .................... 106/285 |
| 6,344,634 | B2 | | 2/2002 | Brennan ....................... 219/681 |
| 6,344,635 | B2 | | 2/2002 | Brennan ....................... 219/681 |

(Continued)

FOREIGN PATENT DOCUMENTS

EP        0 753 490        1/2002

(Continued)

*Primary Examiner* — Matthew J Daniels
*Assistant Examiner* — Russell J Kemmerle, III
(74) *Attorney, Agent, or Firm* — Matthew B. McNutt

(57) ABSTRACT

A ceramic forming batch mixture including inorganic batch materials, such as sources of alumina, titania, and silica, a pore former combination including first and second pore formers with different compositions; an organic binder; and a solvent. Also disclosed is a method for producing a ceramic article involving mixing the inorganic batch materials with the pore former combination having first and second pore formers of different composition, adding an organic binder and a solvent, forming a green body; and firing the green body. A green body having a combination of first and second pore formers with different compositions is disclosed, as are several methods for firing to produce ceramic articles such as aluminum titanate.

36 Claims, 6 Drawing Sheets

U.S. PATENT DOCUMENTS

| | | | |
|---|---|---|---|
| 6,368,992 B1 * | 4/2002 | Beall et al. | 501/94 |
| 6,511,628 B2 | 1/2003 | Gheorghiu et al. | 264/406 |
| 6,537,481 B2 | 3/2003 | Brennan | 264/406 |
| 6,555,031 B2 | 4/2003 | Gadkaree et al. | 264/29.7 |
| 6,555,036 B1 | 4/2003 | Brennan et al. | 264/40.1 |
| 6,620,751 B1 | 9/2003 | Ogunwumi | 501/134 |
| 6,696,132 B2 | 2/2004 | Beall et al. | 428/116 |
| 6,736,875 B2 | 5/2004 | Gadkaree et al. | 55/523 |
| 6,770,111 B2 | 8/2004 | Morena et al. | 55/523 |
| 6,773,481 B2 | 8/2004 | Noguchi et al. | 55/523 |
| 6,783,724 B2 | 8/2004 | Noguchi et al. | 264/631 |
| 6,808,663 B2 | 10/2004 | Noguchi et al. | 264/44 |
| 6,818,580 B2 | 11/2004 | Kumazawa et al. | 501/119 |
| 7,001,861 B2 | 2/2006 | Beall et al. | 501/128 |
| 7,011,788 B2 | 3/2006 | Fukuda et al. | 264/674 |
| 7,429,351 B2 * | 9/2008 | Toda et al. | 264/630 |
| 2002/0003322 A1 * | 1/2002 | Dull et al. | 264/630 |
| 2003/0054154 A1 | 3/2003 | Chen et al. | 428/305.5 |
| 2003/0143370 A1 * | 7/2003 | Noguchi et al. | 428/116 |
| 2003/0151155 A1 * | 8/2003 | Muroi et al. | 264/44 |
| 2004/0029707 A1 | 2/2004 | Beall et al. | 501/119 |
| 2004/0261384 A1 | 12/2004 | Merkel et al. | 55/523 |
| 2004/0262820 A1 | 12/2004 | Brennan et al. | 264/657 |
| 2005/0046063 A1 * | 3/2005 | Toda et al. | 264/44 |
| 2005/0253311 A1 | 11/2005 | Nakamura et al. | 264/630 |
| 2007/0045910 A1 * | 3/2007 | Noguchi et al. | 264/628 |

FOREIGN PATENT DOCUMENTS

| | | |
|---|---|---|
| EP | 1514857 | 4/2003 |
| EP | 1 698 388 | 9/2006 |

* cited by examiner

ALUMINUM TITANATE CERAMIC FORMING BATCH MIXTURES AND GREEN BODIES INCLUDING PORE FORMER COMBINATIONS AND METHODS OF MANUFACTURING AND FIRING SAME

This application claims the benefit of U.S. Provisional Application No. 60/686,117, filed May 31, 2005, entitled "Aluminum Titanate Ceramic Forming Batch Mixtures and Green Bodies Including Pore Former Combinations and Methods of Manufacturing and Firing Same."

BACKGROUND OF THE INVENTION

1. Field of the Invention

The present invention is directed to aluminum titanate ceramic batch mixtures including pore formers, aluminum titanate green bodies including pore formers, and methods for manufacturing and firing aluminum titanate ceramic bodies.

2. Technical Background

Exhaust gases emitted by internal combustion systems utilizing hydrocarbon fuels, such as hydrocarbon gases, gasoline, or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has, for many years, attempted to reduce the quantities of pollutants from automobile engine systems, the first automobiles equipped with catalytic converters having been introduced in the mid 1970's. Cordierite substrates, typically in the form of a honeycomb body, have long been preferred for use as substrates to support catalytically-active components for catalytic converters on automobiles, in part due to cordierite ceramics' high thermal shock resistance. The thermal shock resistance is inversely proportional to the coefficient of thermal expansion. That is, honeycombs with a low thermal expansion have a good thermal shock resistance and can survive the wide temperature fluctuations encountered in their application.

However, in many applications such as, for example, certain diesel particulate filter applications, materials may be required which have a higher level of thermal shock resistance. Thus, there has been a significant effort underway to develop materials and ceramic honeycomb articles which exhibit high thermal shock resistance and combinations of porosity, Coefficient of Thermal Expansion (CTE), and Modulus Of Rupture (MOR) suitable for these more severe diesel particulate filter applications. In particular, aluminum titanate ceramics have emerged as an excellent candidate for such high-temperature applications. In order to achieve the desired high porosity in such aluminum titantate materials, generally above 40%, graphite pore formers have been added to the inorganic batch materials. However, the addition of graphite undesirably may result in very long firing cycles (for example, in excess of 180 hours) to achieve burnout of the graphite without causing part cracking. Furthermore, high levels of graphite are not desired because of the adverse effect on dielectric drying, a conventional approach for drying green bodies formed of inorganic materials.

Thus, it should be recognized that there is an unmet need for a way of achieving the desired high porosity in aluminum titanate articles while doing so with reduced firing cycle length and/or without producing cracked parts and/or complicating the drying process.

SUMMARY OF THE INVENTION

According to a first aspect, the present invention is an aluminum titanate ceramic forming batch mixture, comprising inorganic batch materials including, preferably, sources of alumina, titania, and silica, a pore former combination including a first pore former and a second pore former having a different composition than the first pore former, an organic binder, and a solvent. The use of pore former combinations in aluminum-titanate forming batch mixtures is believed to result in lower overall exothermic reactions, and/or separated exothermic reactions, in the firing schedule thereby reducing the propensity for the parts to crack upon firing. Furthermore, lower levels of graphite or carbon may be employed thereby reducing difficulties in drying. Additionally, the use of pore former combinations may result in substantially shorter firing cycle times. For example, certain pore former combinations have enabled firing cycle times of less than 180 hours, more preferably less than 160 hours, more preferably yet less than 120 hours, and in some embodiments less than 100 hours, or even less than 80 hours.

According to a second aspect, the present invention is an aluminum titanate ceramic forming green body, comprising a homogeneous mixture of inorganic batch materials including sources of alumina, titania, and silica; a pore former combination including a first pore former and a second pore former having differing composition; and an organic binder wherein said green body includes a plurality of interconnected walls forming a plurality of cell channels traversing along the body.

According to another broad aspect, the invention is a method for manufacturing an aluminum titanate ceramic article. This method comprises the steps of mixing inorganic batch materials, preferably including sources of silica, alumina, and titania, with a pore former combination to form a batch composition, said pore former combination including a first pore former and a second pore former of differing composition; adding an organic binder and a solvent to the batch composition and further mixing to form a plasticized mixture; forming a green body from the plasticized mixture (preferably by extrusion); and firing the green body to produce a ceramic article with a predominant phase of aluminum titanate.

According to yet a further broad aspect of the invention, a method is provided for firing a green body to form a ceramic article. The method of firing preferably comprises steps of providing a green body containing inorganic batch materials including sources of alumina, titania, and silica, and a pore former combination including a first pore former and a second pore former having a different composition than the first pore former, increasing a furnace temperature in a first heating stage at a first average ramp rate of greater than 14° C./hour and less than 50° C./hour to burn out the first pore former, preferably holding the furnace temperature in a second heating stage within a first hold temperature zone having a lower limit of greater than 500° C. and an upper limit below 900° C. (more preferably 600-800° C.) for less than 120 hours to burn out the second pore former, preferably increasing the furnace temperature in a third heating stage at a second average ramp rate of greater than 30° C./hour and less than 80° C./hour, and preferably holding the furnace temperature in a fourth heating stage and within a second hold temperature zone of having a lower limit above 1350° C. and an upper limit below 1550° C. (more preferably 1420° C. and 1460° C.) for at least 4 hours. This is preferably followed by cooling from the lower limit above 1350° C. (more preferably above 1420° C.) at an average cooling rate greater than 100° C./hour to below 1000° C. wherein the ceramic article is formed with a predominant phase of aluminum titanate.

According to yet another broad aspect, a method of firing a green body is provided comprising the steps of providing a green body containing aluminum titanate forming inorganic batch materials and a pore former, heating in a furnace to a top temperature within a hold temperature range having an upper limit of below 1550° C. (more preferably below 1460° C.) and a lower limit of above 1350° C. (more preferably above 1420° C.) to form a predominant phase of aluminum titanate, and fast cooling from the lower limit at an average cooling rate greater than 100° C./hour to below 1000° C. wherein decomposition of the predominant phase of aluminum titanate is minimized.

According to preferred aspects of the invention, the preferred pore former combination is selected from the group consisting of carbon (e.g., graphite, activated carbon, petroleum coke, carbon black or the like), starch (e.g., corn, barley, bean, potato, rice, tapioca, pea, sago palm, wheat, canna, or the like), and polymer (e.g., polybutylene, polymethylpentene, polyethylene (preferably beads), polypropylene (preferably beads), polystyrene, polyamides (nylons), epoxies, ABS, Acrylics, polyesters (PET), or the like). Most preferably, the first pore former is a starch (most preferably potato starch) and the second pore former is graphite. The first pore former preferably consists of 5-25%, by weight, of the inorganic batch materials, and the second pore former preferably consists of 5-25%, by weight, of the inorganic batch materials. More preferably, the first pore former consists of starch in 5-15%, by weight, of the inorganic batch materials, and the second pore former consists of graphite in 5-15%, by weight, of the inorganic batch materials.

According to yet another broad aspect of the invention, a method of firing a green body is provided, comprising the steps of providing a green body containing inorganic batch materials and at least one pore former, heating in a first heating stage between room temperature and 500° C. at a first average ramp rate of greater than 14° C./hour and less than 50° C./hour for less than 40 hours, following the first stage, holding the furnace temperature in a second heating stage within a first hold temperature zone having a lower limit above 500° C. and an upper limit below 900° C. for less than 40 hours, following the second stage, increasing the furnace temperature in a third heating stage at a second average ramp rate of greater than about 30° C./hour, and holding the furnace temperature in a fourth heating stage within a second hold temperature zone having a lower limit above 1350° C. and an upper limit below 1550° C. for a sufficient time to convert the green body to a ceramic.

DETAILED DESCRIPTION OF TH INVENTION

According to a first aspect, the present invention is a batch material mixture useful for producing an aluminum titanate forming green body. In particular, such batch mixtures, when formed into green bodies and fired, may produce ceramic articles exhibiting relatively high porosity, for example, greater than 40%; more preferably between 40-65%. Moreover, such batches, when utilized, may allow production of aluminum titanate ceramic articles while utilizing very short firing cycle times, i.e., from the start of furnace heating to the end of the cooling cycle, for example, of less than 180 hours, less than 160 hours, or even less than 120 hours, and in some embodiments less than 100 hours, or even less than 80 hours. Advantageously, such batch mixtures may also contribute to a lower propensity of cracked ceramic parts during firing.

In more detail, the inventive batch mixtures according to embodiments of the invention may contain aluminum titanate ceramic forming compositions with pore former combinations, i.e., combinations of two or more different pore formers. As used herein, "different" means having different compositions than each other. A "pore former" as used herein is a batch addition which helps the produced ceramic article to have interconnected pores (voids) formed therein upon completion of the firing cycle. According to a preferred aspect of the invention, the pore former combination is formed as a mixture of two or more organic materials. The pore former combination will burn out (decompose or oxidize, and typically be converted to produce a gas, such as CO or $CO_2$) and leave the desired void or porosity, which is preferably open-interconnected porosity, within the final aluminum titanate ceramic article during the firing schedule (cycle). This "burning-out" of the pore former combination occurs, preferably, before the formation of the principal ceramic phase, such as a phase of aluminum titanate, and each pore former is preferably sequentially burned out in different temperature ranges within the firing cycle. The use of two or more different pore formers spaces out the exothermic reactions such that the overall temperature peaks are lowered as compared to the prior art single pore former compositions (for example, using graphite alone).

Figure 1:
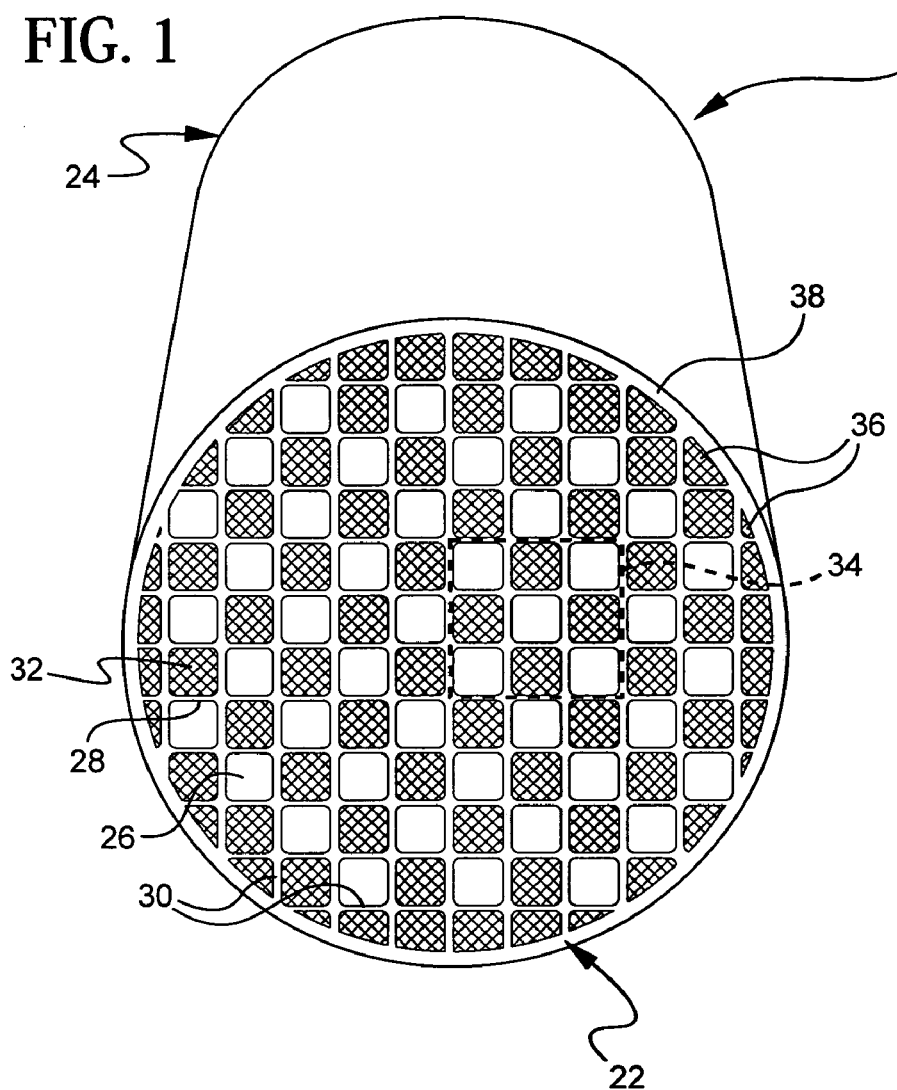
FIG. 1 is a frontal isometric view of an aluminum titanate ceramic article embodied as a particulate filter according to an aspect of the invention.

A typical ceramic article 20, for example containing an aluminum titanate phase, is shown in FIG. 1. This article 20 is preferably configured as a particulate filter and includes an inlet end 22 which is exposed in use to an incoming exhaust stream, and an outlet end 24 opposed thereto, through which the filtered exhaust gases exit. This article 20 includes a plurality of inlet channels 26 extending and traversing along the length of the filter, and a plurality of exit channels 28 also extending and traversing along the length of the filter alongside the inlet channels 26. The shape of the channels is generally square and they may include small radii or bevels on the corners thereof. Although not shown, it should be recognized also that the cross-sectional area of each of the inlet and outlet channels 26, 28 can be different. For example, the average inlet area of inlet channels may be larger than the average outlet area of the outlet channels. Other channel shapes such as rectangular, triangular, octagon, hexagon, circular, or combinations are possible as well. Intersecting cell walls 30 are formed preferably by extruding the inventive batch mixture composition according to the invention through an extrusion die to form an extruded green body. Although extrusion is the preferred forming method, it should be recognized that the forming step may include any known method for forming green bodies.

Figure 2:
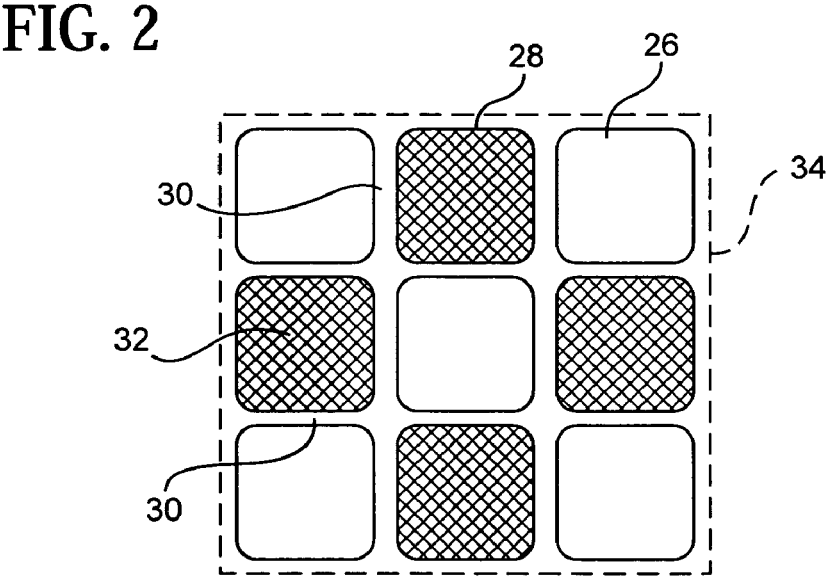
FIG. 2 is an enlarged partial frontal view of a portion of the particulate filter of FIG. 1.

Within the filter article 20, respective inlet 26 and outlet 28 channels are preferably plugged with suitable plugs 32 at the inlet 22 and outlet 24 ends. For clarity, the plugs are not shown on the outlet end. However, it should be understood that the inlet channels 26 are plugged at the outlet end 24 whereas the outlet channels arte plugged at the inlet end 22. Enlarged view 34 of FIG. 2 illustrates the plugs 32 formed in a checkerboard pattern on a portion of the inlet end 22. Plugs are preferably made from suitable ceramic material and extend radially across between the intersecting walls 30 to close off an end of each of the channels. Plugs may be formed by the method described in U.S. Pat. No. 4,557,773, for example. However, any suitable plugging technique may be used. Further, partial channels 36 adjacent to the skin 38 may be plugged on both ends to add strength, if desired. Moreover, although the article described above is a particulate wall-flow filter, it should be recognized that the present invention batch mixture and firing and manufacturing methods may also be useful for non-filter applications, for example, as catalyzed flow-through substrates.

Figure 6:
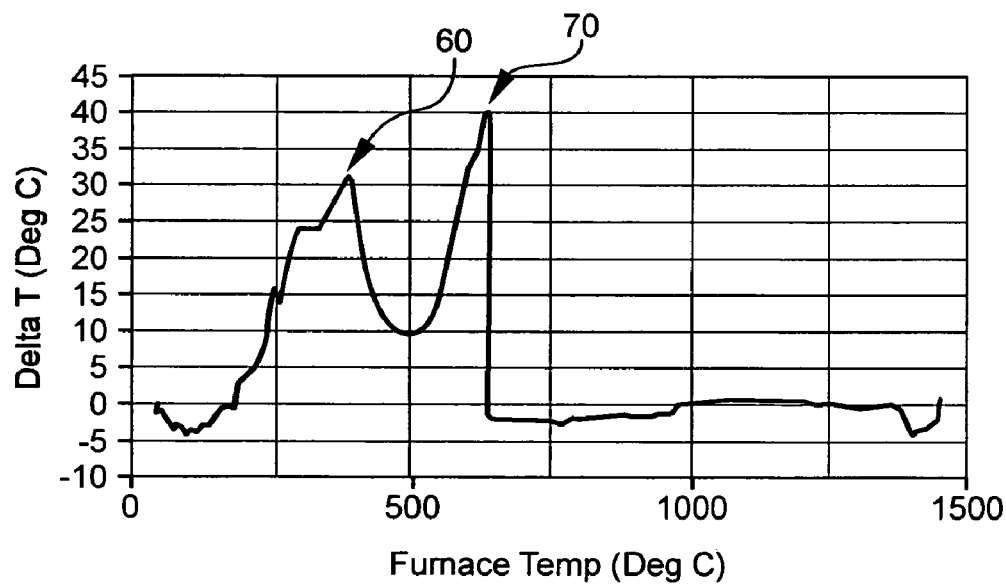
FIG. 6 is a graphical plot illustrating exothermic events versus time when using the present invention.

As was discovered, the pore former combinations according to aspects of the invention, advantageously promote more rapid burnout of the pore formers within the aluminum titanate forming green body, as compared to batch mixtures of the prior art with single component pore formers. More particularly, it has been discovered that combinations of certain types and preferable amounts of pore formers not only may provide relatively high levels of porosity (e.g., greater than 40%) needed for high-temperature diesel particulate filter applications, but they may also result in significantly shorter firing cycles for aluminum titanate articles (e.g., less than 180 hours, less than 160 hours, or even less than 120 hours, and in some embodiments less than 100 hours, or even less than 80 hours). In preferred embodiments, the time needed to burn out the graphite is reduced by 25%, or even 50% or more as compared to parts including only graphite as the pore former. Moreover, such aluminum titanate compositions including the pore former combination may reduce the overall propensity of the resultant ceramic parts to crack upon firing. In particular, the use of multiple, different pore formers separate the exothermic reactions in time during the firing cycle, for example, as is shown in FIG. 6. In particular, these exothermic reactions occur at two different times during the firing cycle. For example, FIG. 6 illustrates a first exothermic peak 60 associated with the burnout of the first pore former, and a second exothermic peak 70 associated with the burnout of the second pore former. These peaks 60, 70 were measured on an actual sample including two different pore formers and fired according to the firing schedule described herein. As illustrated, the Delta T (° C.) represents the difference in temperatures between a pre-fired ceramic part and a green part including the pore former combination at various temperatures (° C.) within the firing cycle. Thus, it should be recognized that the present invention produces spaced peaks thereby reducing the overall Delta T (° C.) at any particular temperature as compared to prior art samples using 100% graphite as the pore former. Accordingly, this allows the firing schedule to be accelerated through this region, resulting in shorter firing times.

In addition to the pore former combination, the aluminum titanate batch forming batch preferably contains sources of inorganic batch materials. The preferred sources of inorganic batch materials comprise at least sources of alumina and titania, and most preferably sources of alumina, titania, and silica. Any suitable form of alumina or titania source may be employed. Most preferably, the sources have a material composition comprised of, as expressed weight percent on an oxide basis, between 40-65% $Al_2O_3$, between 25-40% $TiO_2$, and between 3-12% $SiO_2$. The material composition may also preferably include an alkaline earth metal oxide. Preferred alkaline earth metal oxides are selected from the group consisting of SrO, CaO, and BaO. Most preferably, the composition includes combinations of SrO and CaO. Additionally, the material composition may also preferably include a rare earth metal, such as yttrium, lanthanum, or a member or members of the lanthanide series and combinations thereof. Most preferably lanthanum oxide ($La_2O_3$) is used.

The pore former combination utilized in the batch mixture and green body preferably includes two or more of the following organic pore former materials selected from the group of: carbon (e.g., graphite, activated carbon, petroleum coke, carbon black or the like), starch (e.g., corn, barley, bean, potato, rice, tapioca, pea, sago palm, wheat, canna, or the like), and polymer (e.g., polybutylene, polymethylpentene, polyethylene (preferably beads), polypropylene (preferably beads), polystyrene, polyamides (nylons), epoxies, ABS, Acrylics, polyesters (PET), or the like). Preferred polymers have low density, i.e., with densities of preferably less than 0.97 grams/cc; most preferably less than 0.93 grams/cc.

Various combinations of these pore formers may be employed according to the invention, including combinations of two or even three different pore formers. For example, a combination of polymer and graphite may be used, or a combination of starch and graphite, or a combination of polymer and a starch. However, the most preferred combination comprises the combination of a first pore former having a median particle size between about 35 and 60 microns (preferably a starch, such as potato starch) with a second pore former having a median particle size between about 20 and 40 microns (preferably a carbon, such as graphite). It should be recognized that, however, to be useful, the pore forming material combinations should preferably exhibit exothermic reaction peaks due to their burnout from the green body that are separated in temperature and/or time thereby lowering the peak Delta T(° C.).

According to further embodiments of the invention, the pore former combination preferably includes, as a super addition, an additional weight percent based upon 100% of the total amount of inorganics in the batch mixture, greater than or equal to about 5% and less than about 25% of the first pore former, and greater than or equal to about 5% and less than about 25% of the second pore former. Most preferably, the pore former combination comprises between about 5-15% of the first pore former, and between about 5-15% of the second pore former. More preferably yet, the pore former combination includes a first pore former having about 5-15% of starch (preferably potato starch), and about 5-15% of carbon (preferably graphite). This combination has exhibited excellent properties and has enabled very low firing cycle times, i.e., less than 180 hours, less than 160 hours, or even less than 120 hours. Exemplary embodiments were fired in less than 100 hours, or even less than 80 hours.

Further, although the preferred starch is potato starch, it should be recognized that starches with smaller particle sizes may be used by, for example. In one preferred embodiment, the first pore former which is burned out sequentially first is relatively larger in median particle size as compared to the second pore former being burned out sequentially second. This enables the time to burn out the second pore former, without cracking, to be lowered. In particular, utilizing the pore former combination of the invention may produce ceramic articles with an aluminum titanate primary phase while enabling overall firing cycle times of less than 180 hours, more preferably less than 160 hours, and more preferably yet less than 120 hours. In some embodiments, the complete firing cycle may be accomplished in less than 100 hours, or even less than 80 hours, or even less than 70 hours (see FIGS. 8 and 9, for example).

It should also be recognized that the pore former combination may also include more than two different types of pore formers. For example, some embodiments may include a third pore former, preferably also in an amount greater than or equal to about 5% and less than about 25%. The above-described percentages of pore formers are all calculated as super additions based upon 100% of the weight of the inorganic batch materials.

According to another aspect of the invention, it has been found that by utilizing combinations of pore formers in the aluminum titanate batch mixture, the mixture described herein (upon being formed into a green body and fired) results in a sintered ceramic article, characterized by a primary crystalline phase of aluminum titanate, and which also exhibits desirable physical properties.

In particular, the physical properties of the ceramic article so produced include a combination of high porosity, preferably greater than 40% (as measured by mercury porosimetry), more preferably between 45% and 65%, and a Median Pore Size (MPS) for the article of preferably greater than 10 μm, more preferably between 10-20 μm. Further, such ceramic articles preferably also exhibit a Coefficient of Thermal Expansion (CTE) of less than about $15 \times 10^{-7}/°$ C. as measured between RT-800° C. along the axial direction (extrusion direction) of the sample; and more preferably less than $10 \times 10^{-7}/°$ C. as measured between RT-800° C. Furthermore, the ceramic body is preferably characterized by a relatively high strength, as measured by a Modulus Of Rupture (MOR), of greater than 100 psi; more preferably greater than 150 psi. The present invention is particularly useful for producing crack-free honeycomb aluminum titanate ceramic articles, and more particularly for producing aluminum titanate containing ceramic particulate filters useful for filtering particulate matter from exhaust streams as shown and described with reference to FIGS. 1 and 2.

For the inventive batch mixtures described herein, a suitable source of alumina is a powder which when heated to a sufficiently high temperature in the absence of other raw materials, will yield substantially pure aluminum oxide. Such suitable alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide ($Al(OH)_3$), aluminum oxyhydroxide, or the like, and mixtures thereof. The median particle diameter of the source of alumina is preferably below 35 microns.

A suitable titania source is rutile, anatase, or an amorphous titania. The median particle size of the titania source is important to avoid entrapment of unreacted oxide by the rapidly growing nuclei in the structure. Accordingly, the median particle size is preferably less than 20 micrometers.

Suitable silica sources include non-crystalline silica such as fused silica or sol-gel silica, silicone resin, low-alumina substantially alkali-free zeolite, diatomaceous silica, kaolin, and crystalline silica, such as quartz or cristobalite. Additionally, the silica-forming source can comprise a compound that forms free silica, when heated, for example, silicic acid or a silicon organometallic compound. The median particle size of the silica source is preferably less than 30 micrometers.

If strontium is employed as the preferred alkaline earth metal oxide, then a suitable strontium source is strontium carbonate, with a median particle size of preferably less than 20 micrometers. If barium is employed, suitable preferred barium sources are barium carbonate, barium sulfate, or barium peroxide, with a preferable median particle size of less than 20 micrometers. If calcium is used, the calcium source may be either calcium carbonate or calcium aluminate, with a median particle size of preferably less than 20 micrometers.

If a rare earth is employed, then a suitable source of rare earth oxide is lanthanum oxide ($La_2O_3$), yttrium oxide ($Y_2O_3$), any oxide of the lanthanide series, or combinations thereof.

The aforementioned raw inorganic batch materials are preferably combined as powdered materials in a mixing step sufficient to produce an intimate mixing of the inorganic raw materials. The pore former combination may be added to this mix, either simultaneously or with the other batch components or after the inorganic materials are intimately mixed. In any event, the pore former combination is intimately mixed with the inorganic batch materials to form a homogeneous, preferably powdered mixture of the inorganic materials and pore former combination.

A organic binder system is also added to the batch inorganic materials and pore former combination to help create an extrudable mixture that is both formable and moldable. A preferred multi-component organic binder system for use in the present invention preferably includes a binder of a cellulose-containing component, a surfactant component, and a solvent. The cellulose-containing component may be, for example, an organic cellulose ether binder component selected from the group consisting of methylcellulose, methylcellulose derivatives, and combinations thereof. The surfactant component is preferably oleic acid or tall oil. Finally, the solvent may be water, most preferably ionized water. However, it should be recognized that although this binder system is preferred, any suitable organic binder system may be employed for use with the present invention. Excellent results have been obtained utilizing a binder system which comprises the following amounts, assuming 100 parts by weight of the inorganic materials, about 0.2 to 2.0 parts by weight of the oleic acid or tall oil, about 2.5 to 6.0 parts by weight of a methylcellulose or a hydroxypropyl methylcellulose binder, and about 10-30 parts by weight of water.

The individual components of the binder system are mixed with a mass of the inorganic powder materials and pore former combination, in any suitable known manner, to prepare an intimate homogeneous mixture of the inorganic powder material, pore former combination, and binder system. This aluminum titanate forming batch mixture is capable of being formed into a ceramic green body, for example, preferably by extrusion. For example, all components of the binder system may be previously mixed with each other, and the mixture is then added to the powdered inorganic material previously mixed with the pore former combination. In this case, the entire portion of the binder system may be added at one time, or divided portions of the binder system may be added one after another at suitable intervals. Alternatively, the components of binder system may be added to the ceramic batch materials one after another, or each previously prepared mixture of two or more components of the binder system may be added to the ceramic powder material and pore former combination. For example, the dry components may be first added to the inorganic batch materials and pore former combination mixture, followed by the liquid components. Further, the binder system may be first mixed with a portion of the ceramic powder material. In this case, the remaining portion of the ceramic powder is subsequently added to the prepared mixture. In any case, it is preferred that the binder system be uniformly mixed with the inorganic batch powders and pore former combination in a predetermined portion to form a homogeneous batch mixture. Uniform mixing of the binder system, the ceramic inorganic materials, and the pore former combination may be accomplished by any known kneading process.

The resulting stiff, uniform, homogeneous, and extrudable batch mixture is then further plasticized and shaped or otherwise formed into a green body. Such shaping or forming may be accomplished by any known conventional ceramic forming process, such as, e.g. extrusion, injection molding, slip casting, centrifugal casting, pressure casting, press molding, etc. For the preparation of a thin-walled honeycomb substrate suitable for use as a catalyst support or as a particulate filter, extrusion through a slotted extrusion die is most preferable. For example, U.S. Pat. No. 6,696,132 discloses a "Honeycomb With Varying Size and Die For Manufacturing."

The prepared (preferably extruded) aluminum titanate ceramic forming green body thus formed from the plasticized extrudable batch mixture is then preferably dried prior to firing. Drying may be achieved by any conventional drying method. For example, drying methods such as hot-air, electromagnetic energy drying (e.g., RF or microwave), vacuum drying, freeze drying, or combinations may be used. The dried green body is thereafter suitably fired (as will be described in more detail below) by heating to a sufficient top temperature for a sufficient time to result in a fired ceramic body. Aluminum titanate is the primary crystal phase formed as a result of firing the green body manufactured from the inventive batch mixture described above.

The firing conditions may be varied depending on the process conditions such as specific composition of the batch, size of the green body, and nature of the equipment. However, preferred firing condition schedules illustrating the furnace temperature (° C.) versus firing elapsed time (hours) for the green body are shown in FIGS. 3, and 7-9. In particular, these schedules 40, 40a-40j illustrate the stages desired for burning out the pore former, preferably the pore formers combinations described herein, and for producing the aluminum titanate phase when utilizing the batch mixtures described herein. In particular, the green body is preferably heated in a furnace to a top temperature (the highest temperature of the cycle) preferably in the temperature range having an upper limit below 1550° C. and a lower limit of above 1350° C., and in some embodiments below 1460° C. and above 1420° C. and held at this temperature range preferably for greater than 4 hours; more preferably between 4-30 hours; and more preferably yet between 6-20 hours. During firing, a predominant ceramic crystal phase is formed in the ceramic article, which is of aluminum titanate for the batch described above.

Figure 3:
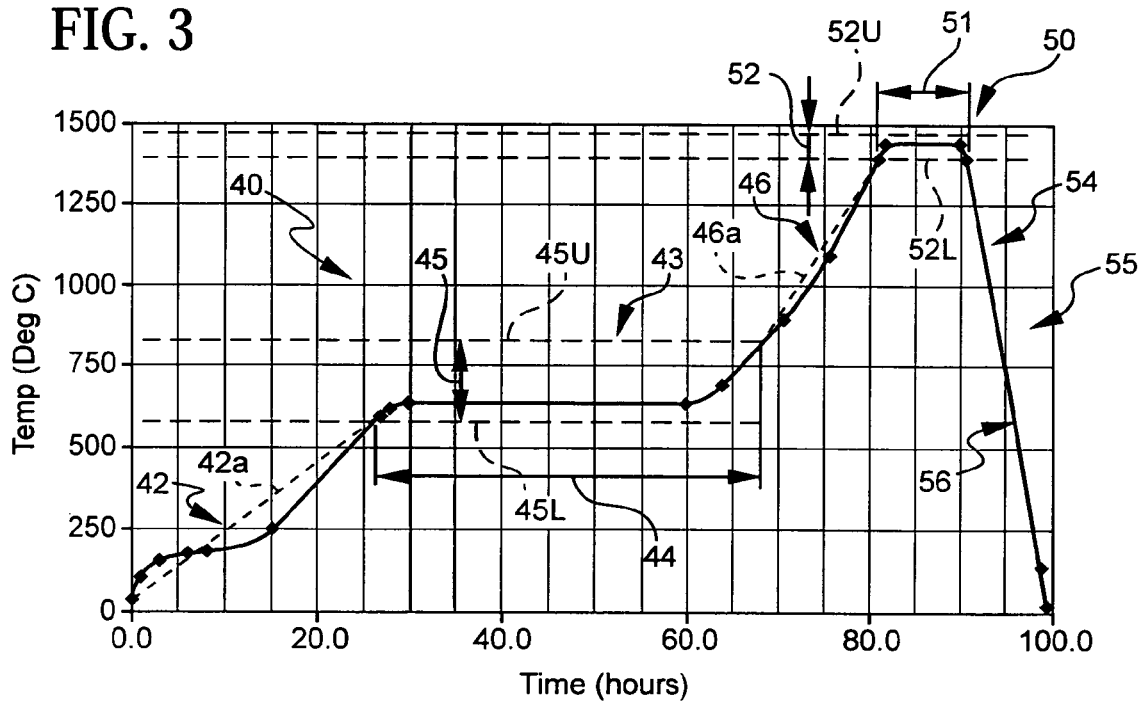
FIG. 3 is a graphical plot of a firing schedule illustrating temperature versus time according to an aspect of the invention.
Figure 7:
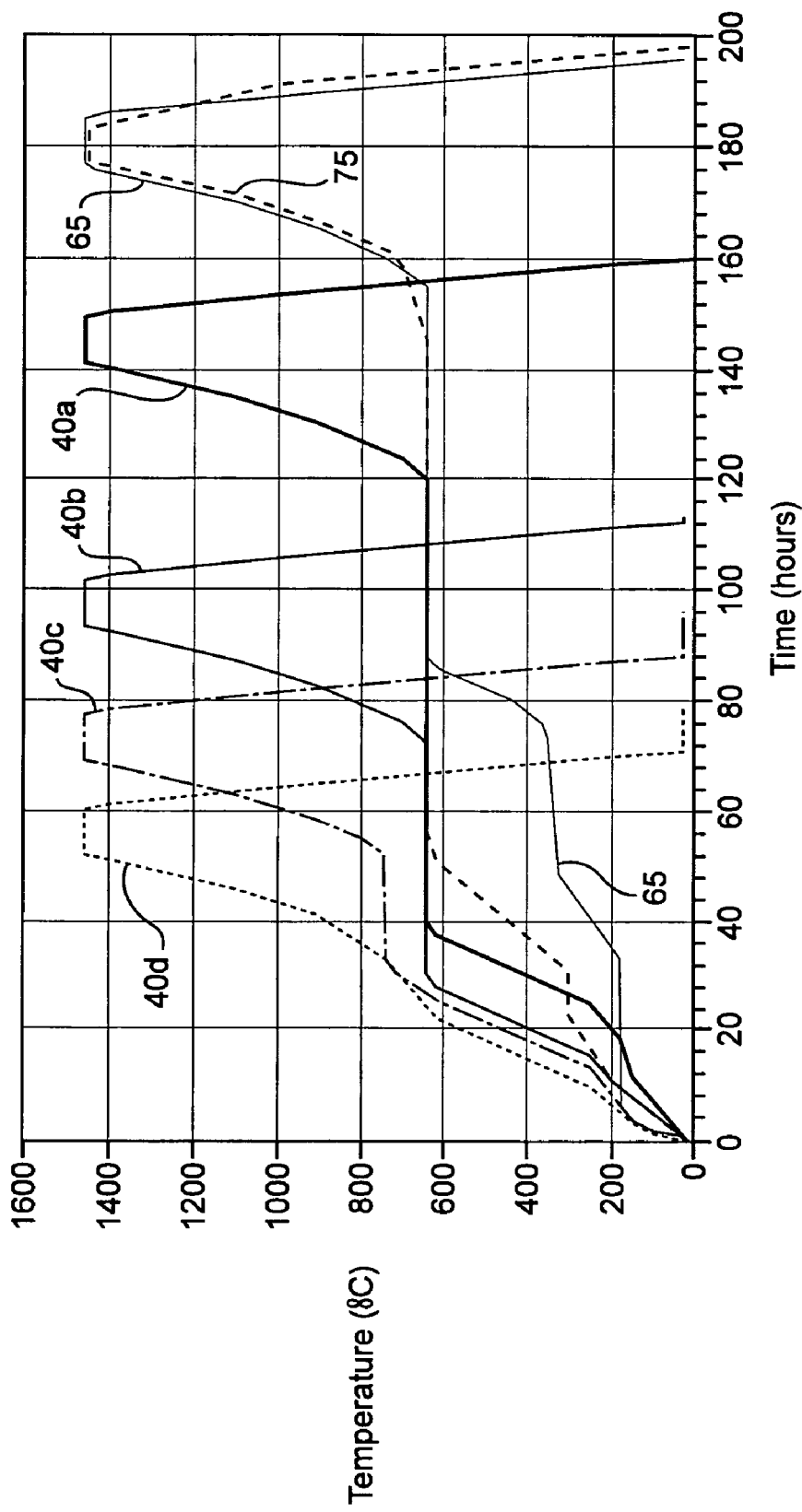
FIG. 7 is a graphical plot illustrating various alternative embodiments of firing schedules according to the invention.

As further illustrated by FIGS. 3 and 7, during the firing cycle, the furnace temperature is ramped up according to a predetermined time and temperature firing schedule 40, 40a-40d. In particular, a preferred method of firing the green body comprises the steps of providing a green body containing aluminum titanate forming inorganic batch materials and, and at least one pore former and most preferably the pore former combination described herein, and then firing the green body according to a firing schedule 40 or 40a-40d.

The firing schedule will be described with reference to FIG. 3 and preferably includes four heating stages 42, 43, 46 and 50 preferably followed by a cooling stage 55, as detailed below. This description is equally applicable to those firing schedules shown in FIG. 7, although the numerals are left off for clarity. The furnace used to carry out the method is preferably a conventional oxygen-controlled furnace capable of peak firing temperatures of about 1500° C. and an oxygen controlled environment whose input is controlled to less than 21% $O_2$. It should be recognized that the inventive firing cycles described herein are applicable for firing green body artless having either single or multiple pore formers.

According to a first aspect of the invention, the furnace temperature is increased in a first heating stage 42 at a first average ramp rate (signified by dotted line 42a) of greater than 14° C./hour to burn out the first pore former. More narrowly, the first average ramp rate may be between 14-50° C./hour. Going too slowly in the first stage 42 may result in extended firing cycle times, while going too fast may result in cracked parts. The Average Ramp Rate (ARR) is measured and defined herein as follows:

$$ARR=(T_b-T_e)/(t_b-t_e)$$

where:
$T_b$ is the initial furnace temperature at the beginning of that stage of the heating cycle,
$T_e$ is the furnace temperature at the end of that stage of the heating cycle,
$t_b$ is the time at the start of that stage of the heating cycle, and
$t_e$ is the time at the end of that stage of the heating cycle.

In relation to the first stage 42, the temperature at the beginning, $T_b$, of the stage is room temperature (25° C.), whereas the temperature at the end, $T_e$, of the heating stage is measured at the temperature of the lower end 45L of the second heating stage 43. The time at the beginning, $t_b$, of the first stage is zero hours, whereas the time at the end, $t_e$, of the first stage 42 is the time at which the temperature of the lower end 45L of second heating stage 43 is reached.

Next, the furnace temperature is preferably held within the second heating stage 43 within a first hold temperature zone 45 within a hold temperature range having a lower zone temperature 45L of above 500° C. and an upper zone temperature 45U of below 900° C.; more preferably above 600° C. and below 800° C. The furnace is held within this first hold temperature zone 45 for a hold time 44 ($t_b-t_e$) of less than 120 hours, more preferably less than 100 hours, more preferably yet less than 60 hours, and most preferably less than 40 hours to substantially burn out the second pore former. In one preferred embodiment, the hold time is less than 20 hours to substantially burn out the second pore former. Most preferably, the hold time is between 10-100 hours; and more preferably yet, between 10-60 hours, and most preferably between 10-40 hours. Within the second heating stage 43, the furnace temperature is preferably held substantially constant. However, it should be understood that the furnace temperature may also be controlled to increase slightly within the zone (See 40d of FIG. 7), as well, provided that the temperature remains within the first hold temperature zone 45 during the hold time 44.

Upon completion of the second heating stage 43, the green body, which now has the pore former combination substantially burned out of it, is subjected to a third heating stage 46. Within this stage 46, the furnace temperature is increased rapidly at a second average ramp rate (ARR), as defined above, of greater than 30° C./hour and less than 80° C./hour; between 30 and 60° C./hour, or even between 40 and 60° C./hour. Again, ramping too slowly in the third stage 46 may result in extending firing times, whereas ramping too fast may crack the parts. The ARR of the third heating stage 46 (as signified by dotted line 46a) is measured from the time, $t_b$, where the temperature exceeds the upper limit 45U until the time, $t_e$, where the furnace temperature equals the temperature of a lower limit 52L of a fourth heating stage 50.

In the fourth heating stage 50, the temperature of the furnace is preferably held within a second hold temperature zone 52 having a lower temperature limit 52L of above 1350° C. and an upper temperature limit 52U of below 1550° C., more preferably above 1420° C. and below 1460° C. The furnace temperature is held between the limits 52L, 52U for a hold time 51 for at least 4 hours; more preferably between 4-20 hours; and more preferably yet between 6-15 hours; and most preferably between 7-13 hours. The hold time 51 is measured from the time where the furnace temperature first reaches the lower limit 52L to the time where the furnace temperature again reaches the lower limit 52L at the end of the fourth heating stage 50. Again, within the hold, the temperature may increase, decrease, or remain substantially constant, so long as it remains in the hold temperature range for at least 4 hours.

After the fourth heating stage 50 is completed and a predominant phase of aluminum titanate is formed in the ceramic article, the furnace temperature is preferably lowered to accomplish cooling of the ceramic article in a cooling stage 55. Cooling, as defined herein, follows the last hold at the top temperature and preferably takes place in a first cooling stage 54 starting at the lower limit 52L of the fourth heating stage 50 and cools at an average cooling rate greater than 100° C./hour, more preferably greater than 120° C./hour to a temperature below 1000° C. Most preferably, the cooling rate is between 100-160° C./hour between the lower limit 52L and 1000° C. The average cooling rate is determined as hereinbefore described wherein the beginning temperature, $T_b$, is the temperature of the lower limit 52L and end temperature, $T_e$, is 1000° C., and the beginning time, $t_b$, is the time when the low limit 52L is reached at the end of hold time 51 and the end time, $t_e$, is the time when 1000° C. is reached during the cooling stage 55. After achieving a furnace temperature below 1000° C., the furnace temperature may be ramped at the same or a slower rate in a second cooling stage 56 if desired, for example, less than 100° C./hour until it reaches room temperature. In actuality, the cooling rate is a negative number. However, for clarity, it is expressed as a positive cooling rate, rather than a negative heating rate.

In particular, according to an aspect of the invention having broad applicability, it was discovered that fast cooling from the second hold at the top temperature, i.e., from the fourth heating stage 50, at a cooling rate of greater than 100° C./hour significantly reduces decomposition of the previously-formed aluminum titanate phase. Accordingly, a higher percentage of the aluminum titanate is retained within the ceramic article. It was determined by the inventors that aluminum titanate is unstable at between 1400-1000° C. and, thus, it is desirable, once the aluminum titanate phase is formed during the hold at the top temperature, to spend as little time in that unstable temperature range as possible. Advantageously, lower CTE may be achieved by fast cooling through this temperature region, particularly when such cooling takes place to below 1000° C. Moreover, it was discovered that decomposition of the aluminum titanate phase is kinetically limited below the temperature of 1000° C. Thus, below that temperature, slower cooling may be employed, if desired.

Figure 4:
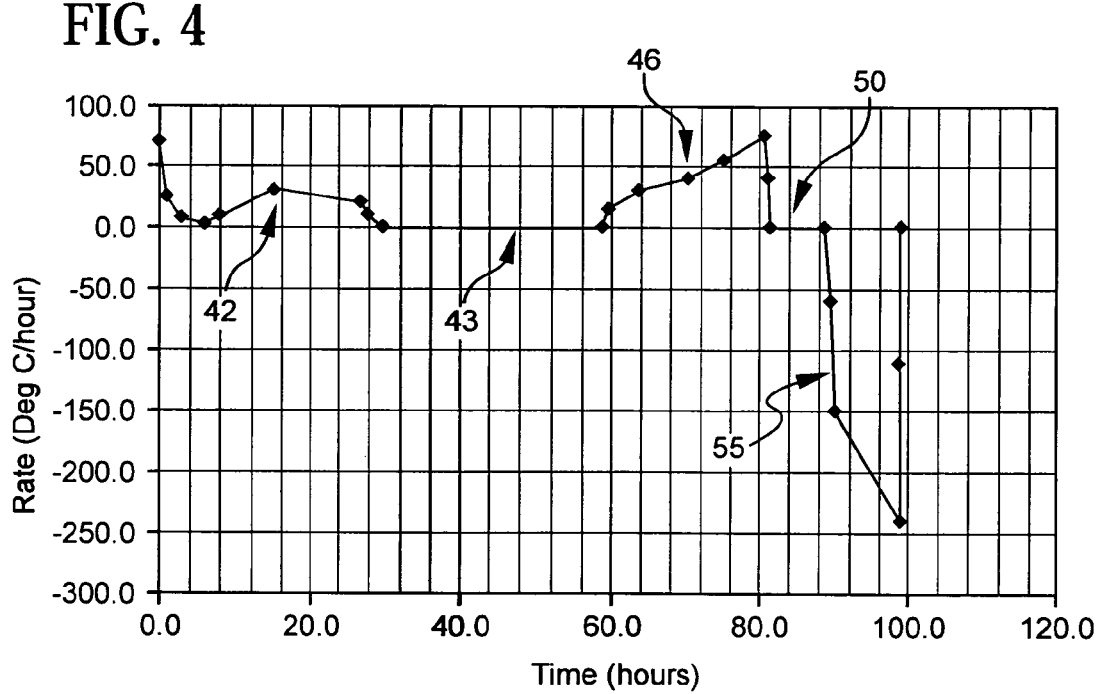
FIG. 4 is a graphical plot of the firing schedule illustrating the rate of change of temperature versus time according to an aspect of the invention.
Figure 5:
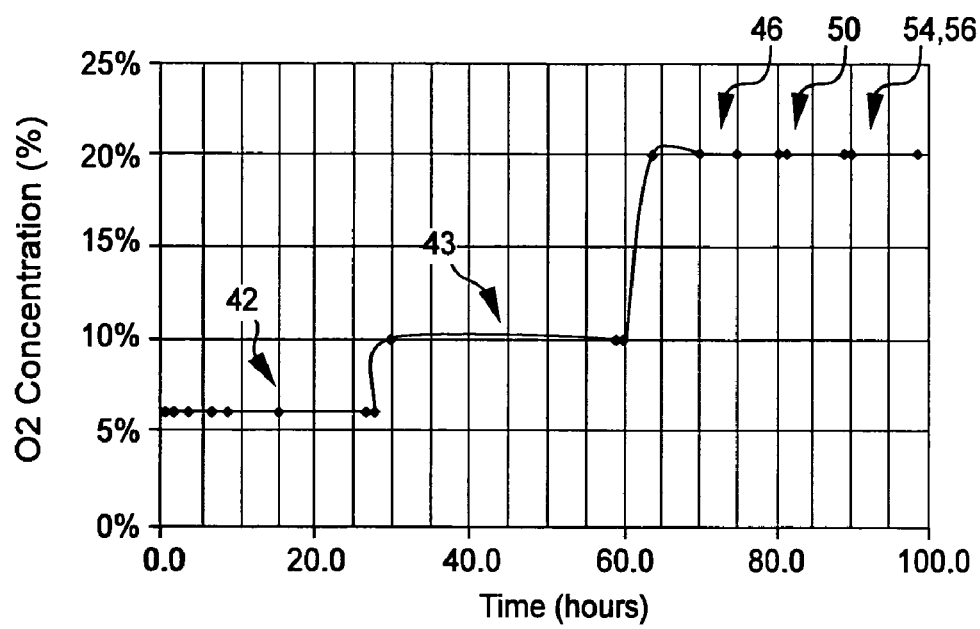
FIG. 5 is a graphical plot of a firing schedule illustrating the oxygen concentration versus time according to a further aspect of the invention.

As indicated previously, a primary utility of the batch mixtures described herein is for preparing high strength aluminum titanate containing honeycomb articles useful as catalyst carriers and/or diesel particulate filters (which may also include a catalyst). Heating rates for the various stages of the heating cycle of FIG. 3 are shown in FIG. 4. As can be seen, the heating rate is positive in the first stage 42, zero or near zero in the second stage 43, positive in the third stage 46, near zero in the fourth stage 50 and negative (cooling) in the cooling stage 55.

In a preferred embodiment, the input oxygen level is also controlled during the firing cycle. Controlling the oxygen rate may be used to further control the burnout rate of the pore former combination. For example, the input oxygen level may be held at an initial low level of less than 10% (preferred about 6%) for the first heating stage 42, then is preferably ramped at a second level of less than about 15% (nominally preferred about 10%) for the first hold 43, and then further preferably ramped up to a third level of less than about 30% (nominally preferred about 20%) for the remaining stages 46, 50, 54, 56. Thus, it should be recognized that the oxygen rate is preferably ramped up during the firing cycle to help control the exothermic peak conditions.

Advantageously, utilizing the inventive batch mixture and the inventive firing schedule enables firing of the ceramic article to occur in much less time than when using a single component pore former in the batch mixture. See comparative examples labeled 65 wherein the sole pore former was polyethylene beads, and example labeled 75 wherein the sole pore former was 30% graphite. In each case, the firing time of the comparative examples is in excess of 180 hours. The present invention enables firing times of less than 180 hours, more preferably less than 160 hours, and more preferably yet less than 120 hours. In some embodiments, the firing time is less than 100 hours (see 40c), or even less than 80 hours (see 40d-j).

Figure 8:
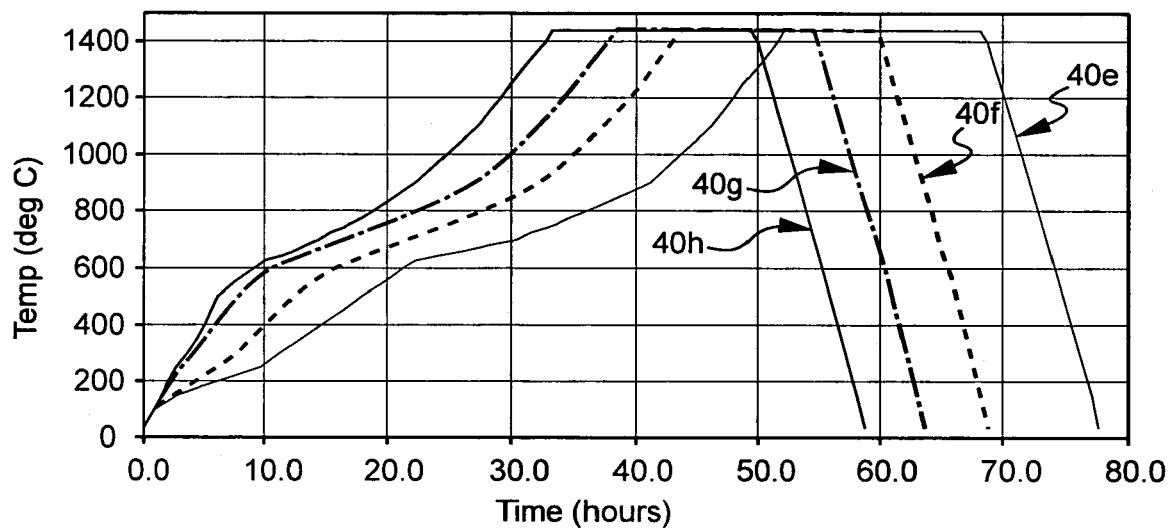
FIGS. 8 and 9 are graphical plots illustrating yet further alternative embodiments of firing schedules according to the invention.
Figure 9:
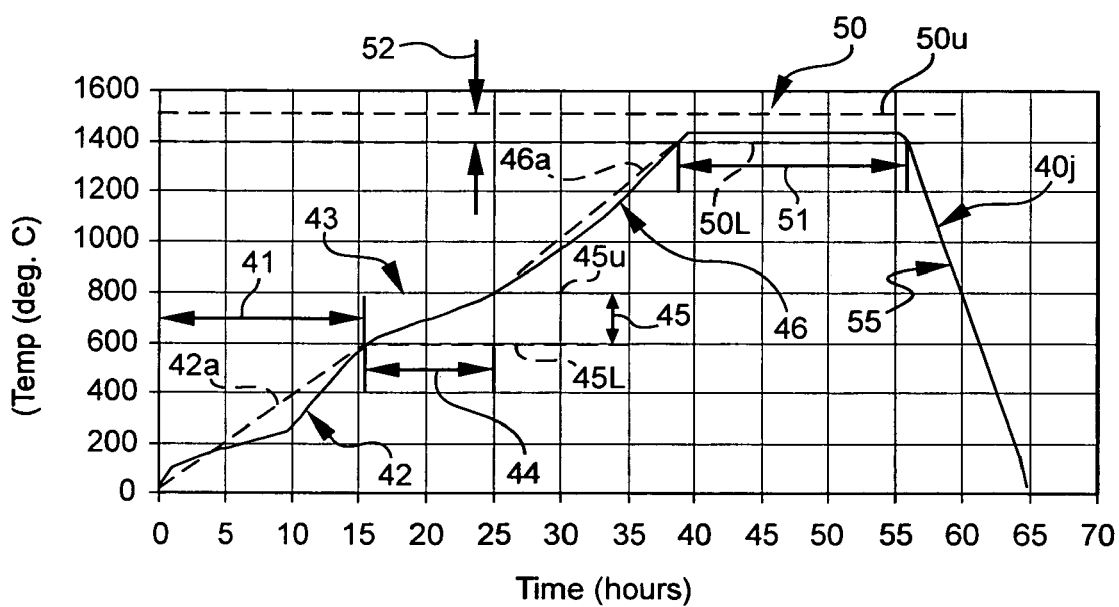

In another broad aspect of the invention, further exemplary firing cycles will be described with reference to FIGS. 8 and 9. In particular, these fast firing cycles will be described in detail with respect to FIG. 9. However, it should be recognized that this description is equally applied to the embodiments of FIG. 8, all of which are useful firing cycles for firing ceramic articles, such as aluminum titanate ceramic articles. However, it should be understood that such firing cycles may be useful for firing other ceramic articles as well, such as cordierite-containing ceramic articles. Accordingly, such firing cycles according to further embodiments of the invention include increasing the furnace temperature in a first heating stage 42 between room temperature (RT) and 500° C. at a first average ramp rate (signified by dotted line 42a) at greater than 14° C./hour to substantially burn out the first pore former or at least convert it into carbon. Most preferably, the first average ramp rate is between 14° C./hour and 50° C./hour. According to certain embodiments, the ramp rate in the region between about 300° C. and 500° C. is greater than about 10° C./hour, or greater than 25° C./hour, or yet even greater than 50° C./hour, and in some embodiments greater than about 75° C./hour (see 40h). The Average Ramp Rate (ARR) is measured and defined above.

Next, the furnace temperature is preferably held within the second heating stage 43 within a first hold temperature zone 45 within a hold temperature range having a lower zone temperature 45L of above 500° C. and an upper zone temperature 45U of below 900° C.; more preferably above 600° C. and below 800° C. The furnace is held within this first hold temperature zone 45 for a hold time 44 of less than 40 hours, or even less than 30 hours, or even yet less than 20 hours to substantially burn out the second pore former. In one preferred embodiment, the hold time is less than 15 hours to burn out the second pore former. Some small portions (e.g., <10%) of the mass of the pore former may be removed above 900° C. According to these embodiments, the hold time is between 10-40 hours; or even as low as between 10-30 hours. Within the second heating stage 43, the furnace temperature may be held substantially constant or be controlled to increase slightly within the zone at an average ramp rate of greater than 10° C./hour; or even greater than 15° C./hour, for example. In some embodiments, the ramp rate is greater than or equal to about 20° C./hour between 600° C. and 800° C.

Upon completion of the second heating stage 43, the green body, which now has the pore former combination substantially burned out of it, is subjected to a third heating stage 46. Within this stage 46, the furnace temperature is increased more rapidly, as compared to the second stage 43, at a second average ramp rate (ARR), as defined above, of greater than or equal to about 30° C./hour, or even greater than or equal to about 40° C./hour. According to exemplary embodiments, the second average ramp rate is greater than or equal to about 40° C./hour less than or equal to about 60° C./hour; or even greater than or equal to about 40° C./hour and less than or equal to 50° C./hour. The ARR of the third heating stage 46 (as signified by dotted line 46a) is measured from the time where the temperature exceeds the upper limit 45U until the time where the furnace temperature equals the temperature of a lower limit 52L of a fourth heating stage 50.

In the fourth heating stage 50, the temperature of the furnace is preferably held within a second hold temperature zone 52 having a lower temperature limit 52L of above 1350° C. and an upper temperature limit 52U of below 1550° C. for a sufficient time to form the desired ceramic phase, such as an aluminum titanate phase. According to certain exemplary embodiments, the furnace temperature is held above 1400° C. and below 1460° C. The furnace temperature may preferably be held between the limits 52L, 52U for a hold time 51 of at least 10 hours. To ensure proper ceramic phase formation and a short firing cycle, the hold may be between 12-20 hours. The hold time 51 is measured from the time where the furnace temperature first reaches the lower limit 52L to the time where the furnace temperature again reaches the lower limit 52L at the end of the fourth heating stage 50. Again, within the hold, the temperature may increase, decrease, or remain substantially constant, so long as it remains in the hold temperature range for the desired time for phase formation. These cycles may be also used for firing green body articles formed from batches containing only a single pore former.

Figure 10:
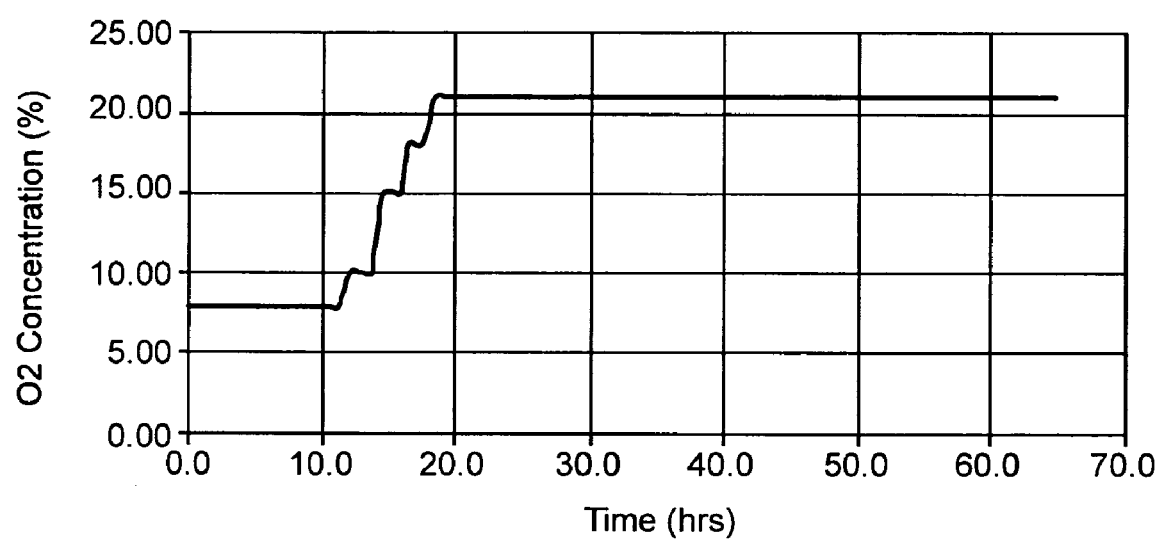
FIG. 10 is a graphical plot illustrating input oxygen concentration versus time for an exemplary firing schedule according to the invention.

During the heating stages, the oxygen concentration into the furnace is preferably controlled to be relatively lower in the early stages of the firing cycle. The method preferably comprises a step of increasing an oxygen concentration into the furnace to greater than 15% in less than 80 hours. In some embodiments, the oxygen concentration input is controlled to be greater than 15% in less than 40 hours, or even greater than 15% in less than 30 hours (See FIG. 10). The oxygen may be held at a lower level in the first stage 42 then is increased within the second 43 and third stages 46 and is held constant or reduced in the fourth stage.

After the fourth heating stage 50 is completed and preferably a predominant phase of aluminum titanate is formed in the ceramic article, the furnace temperature is preferably lowered to accomplish cooling of the ceramic article in a cooling stage 55. Cooling, as defined herein, follows the last hold at the top temperature and cools at an average cooling rate greater than 100° C./hour, greater than 120° C./hour, or even greater than 140° C./hour to a temperature below 1000° C. Most preferably, the cooling rate is between 100-160° C./hour between the lower limit 52L and 1000° C. The average cooling rate is determined as hereinbefore described. After achieving a furnace temperature below 1000° C., the furnace temperature may be ramped at the same rate as described above or at a slower rate if desired, for example, less than 1000° C./hour until it reaches room temperature. In actuality, the cooling rate is a negative number. However, for clarity, it is expressed as a positive cooling rate, rather than a negative heating rate.

To further illustrate the principle aspects of the present invention, there will be described numerous examples of the ceramic articles formed utilizing the present invention. However, it is to be understood that the examples are given for illustrative purpose only, and the invention is not limited thereto, but various modifications and changes may be made in the invention, without departing from the scope of the invention.

EXAMPLE 1

Inorganic powder batch mixtures suitable for the formation of a ceramic article having aluminum titanate as its primary crystalline phase are listed in Table II; as Examples A-H. Each of the example compositions A-H was prepared by combining and dry mixing together the inorganic components of the designated inorganic mixture as listed in Table II. To these mixtures was added an amount of the pore former combination designated in Table I. Further, the organic binder system listed in Table II was added to each and this intermediate mixture was thereafter further mixed with de-ionized water as the solvent to form a plasticized ceramic batch mixture. The binder system components and pore former combination, as detailed in Table I and II below are listed in % by weight, based on 100% of the total inorganics.

Table II reports the actual raw materials utilized in Examples, the binder system used for each, and the oxide weights of the components in the preferred material composition of the final ceramic article. Each of the various plasticized mixtures were extruded through an extrusion die under conditions suitable to form honeycomb articles having 300 cell/in$^2$ (46.5 cells/cm$^2$) and 12 mil (0.305 mm) thick cell walls.

The green ceramic honeycomb bodies formed (extruded) from each of the batch mixture compositions were sufficiently dried to remove any water or liquid phases that might be present. Thereafter, they were subjected to a firing cycle (see above) to remove the organic binder system, pore former combination, and to sinter, the honeycombs to form a ceramic article. Specifically, the green bodies of each type of substrate were fired according to the above described preferred firing conditions suitable for forming ceramic bodies with a primary aluminum titanate crystalline phase.

Table I below additionally reports selected properties for the ceramic articles produced from these inventive batch mixtures and green bodies. Properties included for each of the ceramic bodies manufactured include the Modulus Of Rupture (MOR) strength of the 300/12 ceramic ware measured by four-point loading, in psi; the coefficient of thermal expansion (CTE) of the ceramic ware at a temperature range between RT-800° C. (×10$^{-7}$/° C.) as measured by dilatometry; the volume percent open porosity, in %; and the Median Pore Size (MPS), in μm, as measured by Hg porosimetry.

TABLE I

Aluminum-Titanate Batch Mixture Examples

| Ex. # | AT BATCH | PORE FORMER 1 | PORE FORMER 2 | PORE FORMER 3 | Porosity (%) | MPS (μm) | CTE ($10^{-7}$/°C.) @RT–800° C. | MOR (psi) |
|---|---|---|---|---|---|---|---|---|
| 1 | A | 5% Graphite | 5% PE Beads | — | 41.5 | 11.9 | −0.2 | — |
| 2 | A | 5% Graphite | 10% PE Beads | — | 48.8 | 13.7 | 2.0 | — |
| 3 | A | 10% Graphite | 10% PE Beads | — | 50.2 | 14.1 | 3.4 | — |
| 4 | A | 20% Graphite | 20% PE Beads | — | 61.1 | 18.5 | 9.8 | — |
| 5 | E | 10% Graphite | 12.5% PE Beads | — | 54.6 | 16.0 | 5.1 | — |
| 6 | B | 10% Graphite | 10% PE Beads | — | 50.9 | 15.2 | 2.6 | 184 |
| 7 | A | 10% Graphite | 10% PP Beads | — | 50.1 | 15.7 | 2.7 | 192 |
| 8 | A | 10% Graphite | 12.5% PP Beads | — | 51.8 | 12.8 | 6.8 | 224 |
| 9 | B | 12.5% Graphite | 15% Corn Starch | — | 54.1 | 15.3 | 4.8 | 161 |
| 10 | B | 15% Graphite | 15% Corn Starch | — | 53.6 | 15.5 | 4.6 | 155 |
| 11 | A | 10% Graphite | 5% Potato Starch | — | 46.2 | 14.7 | 0.9 | 265 |
| 12 | A | 10% Graphite | 10% Potato Starch | — | 54.3 | 18.1 | 3.1 | 166 |
| 13 | A | 10% Graphite | 10% Potato Starch | — | 51.8 | 17.3 | 2.7 | 215 |
| 14 | C | 10% Graphite | 5% Potato Starch | — | 44.2 | 14.6 | 2.3 | 285 |
| 15 | C | 10% Graphite | 15% Potato Starch | — | 55.3 | 18.7 | 3.3 | 179 |
| 16 | D | 15% Graphite | 10% Potato Starch | — | 51.2 | 18.1 | 2.1 | 194 |
| 17 | A | 20% Graphite | 5% Potato Starch | — | 47.0 | 14.9 | 2.2 | 231 |
| 18 | C | 20% Graphite | 15% Potato Starch | — | 55.4 | 19.8 | 5.3 | 183 |
| 19 | D | 10% Graphite | 10% Potato Starch | — | 48.8 | 18.2 | 1.8 | 221 |
| 20 | D | 15% Graphite | 5% Potato Starch | — | 53.0 | 18.5 | 3.3 | 165 |
| 21 | D | 15% Graphite | 15% Potato Starch | — | 54.0 | 12.9 | 3.2 | 153 |
| 22 | D | 20% Graphite | 10% Potato Starch | — | 55.0 | 18.6 | 3.2 | 165 |
| 23 | A | 15% Graphite | 10% Potato Starch | — | 53.0 | 17.2 | 1.9 | 181 |
| 24 | C | 15% Graphite | 10% Potato Starch | — | 53.2 | 18.0 | 3.4 | 198 |
| 25 | A | 20% Graphite | 5% Potato Starch | — | 49.2 | 12.7 | 4.1 | 249 |
| 26 | A | 15% Graphite | 15% Potato Starch | — | 54.8 | 19.2 | 4.1 | 137 |
| 27 | A | 12.5% Graphite | 12.5% Potato Starch | — | 54.0 | 18.4 | 3.1 | 169 |
| 28 | A | 12.5% Graphite | 10% Potato Starch | — | 51.4 | 17.3 | 2.6 | 208 |
| 29 | A | 10% Graphite | 10% Corn Starch | — | 49.9 | 13.4 | 6.0 | 240 |
| 30 | A | 5% Graphite | 20% Potato Starch | — | 57.1 | 21.1 | 3.76 | 133 |
| 31 | A | 10% Graphite | 12.5% Canna Starch | — | 51.5 | 19.4 | 1.9 | 180 |
| 32 | A | 10% Graphite | 12.5% Sago Starch | — | 53.0 | 18.2 | 3.6 | 173 |
| 33 | A | 10% Graphite | 12.5% Potato Starch | — | 51.5 | 17.0 | 7.4 | 219 |
| 34 | A | 10% Graphite | 10% Green Bean Starch | — | 54.0 | 16.0 | 2.9 | 220 |
| 35 | A | 10% Graphite | 8% Green Bean Starch | — | 52.3 | 14.5 | 3.4 | 248 |
| 36 | A | 10% Graphite | 12.5% Corn Starch | — | 50.6 | 15.1 | 5.3 | 179 |
| 37 | A | 10% Graphite | 15% Corn Starch | — | 50.1 | 15.2 | 6.4 | 173 |
| 38 | A | 8% Graphite | 10% Potato Starch | — | 53.2 | 17.0 | 2.7 | 194 |
| 39 | A | 10% Graphite | 8% Potato Starch | — | 52.2 | 16.3 | 1.4 | 210 |
| 40 | A | 10% Graphite | 7% Potato Starch | — | 51.2 | 16.7 | 2.5 | 223 |
| 41 | A | 8% Graphite | 8% Potato Starch | — | 50.4 | 17.1 | 1.7 | 224 |
| 42 | A | 5% Graphite | 5% Potato Starch | 5% Corn Starch | 51.5 | 15.1 | 2.0 | 235 |
| 43 | A | 10% Graphite | 5% Potato Starch | 5% Corn Starch | 51.8 | 16.2 | 2.3 | 168 |

TABLE II

Example Batches

| | Example Batches | | | | |
|---|---|---|---|---|---|
| | A | B | C | D | E |
| INORGANICS | | | | | |
| Alumina (A10) | 46.57 | 42.21 | 46.57 | 46.57 | 49.67 |
| Alumina (CP5) | 0.0 | 7.72 | 0.0 | 0.0 | 0.0 |
| Al(OH)$_3$ | 3.71 | 0.0 | 3.71 | 3.71 | 0.0 |
| Titania Ti-Pure | 29.95 | 30.16 | 29.95 | 29.95 | 30.33 |
| Silica (Cerasil 300) | 10.19 | 10.26 | 7.64 | 8.92 | 10.31 |
| Silica Resin | 0.0 | 0.0 | 8.49 | 4.25 | 0.0 |
| SrCO$_3$ | 8.0 | 8.06 | 8.0 | 8.00 | 8.10 |
| CaCO$_3$ | 1.38 | 1.39 | 1.38 | 1.38 | 1.39 |
| La$_2$O$_3$ | 0.2 | 0.2 | 0.2 | 0.2 | 0.2 |
| ORGANIC BINDER SYSTEM | | | | | |
| Methylcellulose | 4.5 | 4.5 | 4.5 | 4.5 | 4.5 |
| Tall Oil | 1.0 | 1.0 | 1.0 | 1.0 | 1.0 |
| Solvent (Water) | 15 | 17 | 12 | 21 | 15 |
| OXIDE WT. % | | | | | |
| Al$_2$O$_3$ | 51.12 | 51.13 | 51.11 | 51.11 | 51.19 |
| TiO$_2$ | 31.33 | 31.33 | 31.34 | 31.33 | 31.29 |
| SiO$_2$ | 10.65 | 10.64 | 10.65 | 10.66 | 10.62 |
| SrO | 5.87 | 5.87 | 5.87 | 5.87 | 5.87 |
| CaO | 0.83 | 0.83 | 0.83 | 0.83 | 0.83 |
| La$_2$O$_3$ | 0.2 | 0.20 | 0.2 | 0.20 | 0.2 |
| Total: | 100.0 | 100.0 | 100.0 | 100.0 | 100.0 |

Tables I and II above illustrate representative batch components, organic binder systems, pore former combinations, and various physical properties for several examples of aluminum titanate ceramic batch mixtures and ceramic articles produced according to aspects of the present invention. Each of the ceramic articles according to the invention, upon being fired, comprises a predominant ceramic phase, preferably a phase of aluminum titanate, most preferably including at least 50% of the aluminum titanate phase; more preferably at least 60%.

Each of the Examples above includes a preferred homogeneous material composition, as expressed on an oxide weight % basis, of 40-65% $Al_2O_3$, 25-40% $TiO_2$, and 3-12% $SiO_2$. More preferably yet, the composition includes between 45-55% $Al_2O_3$, 27-35% $TiO_2$, and 8-12% $SiO_2$. Furthermore, the composition preferably also includes 2-10% of an alkali earth metal oxide such as SrO, CaO, BaO or combinations. In a most preferred embodiment, the composition includes a combination of SrO and CaO. As can be seen from the examples, the composition preferably includes a small amount (preferably 0.01-2%) of a rare earth oxide, such as $La_2O_3$. $Y_2O_3$ or an oxide of the lanthanide series may be optionally used.

Each example listed above also exhibits porosity of the interconnected cell walls of greater than 40%; and more preferably greater than 40% and less than 65% as measured by mercury intrusion porosimetry by using a porosimeter. However, many embodiments include porosity of greater than 45% and less than 60%; or even greater than 50%, or even yet between 50-60%, and many between 50-55%.

According to another aspect of the invention, the aluminum titanate ceramic article produced preferably includes a median pore size that is preferably greater than 10 µm; or even between 10-25 µm; or even yet between 12-20 µm; and in some embodiments between 15-19 µm.

Further, the aluminum titanate ceramic article according to the present invention preferably includes a CTE measured between RT-800° C. that is less than $15 \times 10^{-7}$/° C.; or even less than $10 \times 10^{-7}$/° C.; and many less than $5 \times 10^{-7}$/° C. In some embodiments, the CTE is less than $3 \times 10^{-7}$/° C. between RT-800° C. These CTE values are as measured on a 2 inch×¼ inch×¼ inch cellular sample in the axial direction (along the 2 inch length—i.e., the direction of extrusion).

Aluminum titanate ceramic articles produced using the batch mixtures according to the present invention exhibit good strength by having MOR values preferably greater than 100 psi, or even greater than 150 psi, and most preferably greater than 200 psi. The listed MOR values in Table I are measured on samples having 300 cells/in² (46.5 cells/cm²) with a 0.012 inch (0.305 mm) wall thickness wherein the sample includes a length of 5 inch (127 mm), a width of 1 inch (25.4 mm), and a height of ½ inch (12.7 mm).

According to one preferred aspect of the invention, aluminum titanate ceramic articles produced utilizing the batch mixture of the invention preferably exhibit a combination of material properties including porosity of greater than 50% and less than 60%; median pore size that is preferably greater than 10 µm and less than 15 µm; CTE measured between RT-800° C. that is less than $10 \times 10^{-7}$/° C., and good strength by having MOR values preferably greater than 150 psi. This combination of physical properties in an aluminum titanate ceramic article is discovered by the inventors to be particularly useful for diesel particulate filter applications.

It should be understood that while the present invention has been described in detail with respect to certain illustrative and specific embodiments thereof, it should not be considered limited to such, as numerous modifications are possible without departing from the broad scope of the present invention as defined in the appended claims.

What is claimed is:

1. A method of manufacturing an aluminum titanate containing ceramic article, comprising the steps of:

mixing inorganic batch materials with a pore former combination to form a batch composition, said pore former combination including a first pore former and a second pore former of differing composition;

adding an organic binder and a solvent to the batch composition and further mixing to form a plasticized mixture;

forming a green body from the plasticized mixture; and firing the green body to produce a prominent phase of aluminum titanate, wherein the step of firing further comprises the steps of:

increasing a furnace temperature in a first stage at a first average ramp rate of greater than 14° C./hour and less than 50° C./hour to burn out the first pore former, holding the furnace temperature substantially constant in a second stage within a first hold zone having a lower limit above 500° C. and a upper limit below 900° C. for between 10 and 120 hours to burn out the second pore former, increasing the furnace temperature in a third stage at a second average ramp rate of greater than 30° C./hour and less than 80° C./hour, holding the furnace temperature in a fourth stage and within a second hold zone having a lower limit above 1350° C. and an upper limit below 1550° C. for at least 4 hours;

wherein the oxygen level in the furnace is controlled during firing by the following steps:

holding the oxygen level at a level of less than 10% during the first stage, increasing the oxygen to a level that is less than 15% during the second stage, and increasing the oxygen to a level that is less than 30% during the third stage.

2. A method of manufacturing an aluminum titanate containing ceramic article of claim 1 wherein the step of mixing inorganic batch materials further comprises mixing sources of silica, alumina, and titania.

3. The method of manufacturing an aluminum titanate containing ceramic article of claim 1 wherein the step of firing produces the ceramic article which exhibits a porosity of greater than 40%.

4. The method of manufacturing an aluminum titanate containing ceramic article of claim 1 wherein the step of mixing inorganic batch materials comprises mixing the first and second pore formers which are selected from a group consisting of carbon, polymer, and starch.

5. The method of manufacturing an aluminum titanate containing ceramic article of claim 1 wherein the step of firing produces the ceramic article having a material composition, expressed in weight % on an oxide basis, comprising 40-65% $Al_2O_3$, 25-40% $TiO_2$, and 3-12% $SiO_2$.

6. The method of manufacturing an aluminum titanate containing ceramic article of claim 1, wherein the step of firing further comprises the step of:

cooling from the lower limit of the second hold zone at an average cooling rate greater than 100° C./hour to below 1000° C.

7. The method of manufacturing a aluminum titanate containing ceramic article of claim 1, wherein the step of firing produces the ceramic article having a porosity of greater than 50% and less than 60%; a median pore size that is preferably greater than 10 µm and less than 15 µm; a CTE measured between RT-800° C. of less than $10 \times 10^{-7}$/° C., and a MOR value greater than 150 psi.

8. A method of firing a green body, comprising the steps of:
providing a green body containing inorganic batch materials, an organic binder, and a pore former combination including a first pore former and a second pore former having a different composition than the first pore former,
increasing a furnace temperature in a first heating stage at a first average ramp rate of greater than 14° C./hour and less than 50° C./hour to burn out the first pore former,
holding the furnace temperature substantially constant in a second heating stage within a first hold temperature zone having a lower limit 500° C. and a upper limit below 900° C. for between 10 and 120 hours to burn out the second pore former,
increasing the furnace temperature in a third stage at a second average ramp rate of greater than 30° C./hour and less than 80° C./hour, and
holding the furnace temperature in a fourth heating stage and within a second hold temperature zone having a lower limit above 1350° C. and an upper limit below 1550° C. for at least 4 hours wherein a ceramic article is formed with a predominant phase of aluminum titanate;
wherein the oxygen level in the furnace is controlled during firing by the following steps:
holding the oxygen level at a level of less than 10% during the first stage,
increasing the oxygen to a level that is less than 15% during the second stage, and
increasing the oxygen to a level that is less than 30% during the third stage.

9. The method of claim 8, further comprising a step of cooling from the lower limit at an average cooling rate greater than 100° C./hour to below 1000° C.

10. The method of claim 8, wherein the step of holding the furnace temperature in the second heating stage is for less than 100 hours.

11. The method of claim 8, wherein the step of holding the furnace temperature in the second heating stage is for less than 80 hours.

12. A method of firing a green body, comprising the steps of:
providing a green body containing aluminum titanate forming inorganic batch materials, an organic binder, and a pore former combination including a first pore former and a second pore former having a different composition than the first pore former,
heating in a furnace to a top temperature within a hold temperature range having an upper limit below 1550° C. and a lower limit above 1350° C. to form a predominant phase of aluminum titanate, wherein heating includes:
increasing a furnace temperature in a first stage at a first average ramp rate of greater than 14° C./hour and less than 50° C./hour to burn out the first pore former,
holding the furnace temperature substantially constant in a second stage within a first hold temperature zone having a lower limit above 500° C. and a upper limit below 900° C. for between 10 and 120 hours to burn out the second pore former, and
fast cooling from the lower limit at an average cooling rate greater than 100° C./hour to below 1000° C. wherein decomposition of the predominant phase of aluminum titanate is minimized;
wherein the oxygen level in the furnace is controlled during firing by the following steps:
holding the oxygen level at a level of less than 10% during the first stage,
increasing the oxygen to a level that is less than 15% during the second stage, and
increasing the oxygen to a level that is less than 30% during the third stage.

13. The method of firing a green body of claim 12, wherein the step of heating further includes increasing the furnace temperature in a third stage at a second average ramp rate of greater than 30° C./hour and less than 80° C./hour.

14. A method of firing a green body, comprising the steps of:
providing a green body containing inorganic batch materials, an organic binder, and a pore former combination including a first pore former and a second pore former having a different composition than the first pore former,
heating in a first heating stage between room temperature and 500° C. at a first average ramp rate of greater than 14° C./hour and less than 50° C./hour for less than 40 hours to burn out the first pore former,
following the first stage, holding the furnace temperature substantially constant in a second heating stage within a first hold temperature zone having a lower limit above 500° C. and a upper limit below 900° C. for less than 40 hours to burn out the second pore former,
following the second stage, increasing the furnace temperature in a third heating stage at a second average ramp rate of greater than about 30° C./hour, and
holding the furnace temperature in a fourth heating stage within a second hold temperature zone having a lower limit above 1350° C. and an upper limit below 1550° C. for a sufficient time to convert the green body to a ceramic;
wherein the oxygen level in the furnace is controlled during firing by the following steps:
holding the oxygen level at a level of less than 10% during the first stage,
increasing the oxygen to a level that is less than 15% during the second stage, and
increasing the oxygen to a level that is less than 30% during the third stage.

15. The method of claim 14, further comprising a step of cooling from the lower limit at an average cooling rate greater than 100° C./hour to below 1000° C.

16. The method of claim 14, wherein the step of heating in the first heating stage between room temperature and 500° C. is for less than 30 hours.

17. The method of claim 16, wherein the step of heating in the first heating stage between room temperature and 500° C. is for less than 20 hours.

18. The method of claim 14 wherein within a temperature range between about 300° C. and 500° C. in the first heating stage, a heating rate is greater than about 10° C./hour.

19. The method of claim 18 wherein the heating rate is greater than about 25° C./hour.

20. The method of claim 18 wherein the heating rate is greater than about 50° C./hour.

21. The method of claim 18 wherein the heating rate is greater than about 75° C./hour.

22. The method of claim 14, wherein an average ramp rate in the second heating stage is greater than 10° C./hour.

23. The method of claim 14, wherein the step of holding the furnace temperature in the second heating stage is for less than 30 hours.

24. The method of claim 23, wherein the step of holding the furnace temperature in the second heating stage is for less than 20 hours.

25. The method of claim 14, wherein the step of holding the furnace temperature in the second heating stage is for less than 20 hours.

26. The method of claim 14, wherein the third heating stage has an second average ramp rate of greater than about 40° C./hour and less than about 60° C./hour.

27. The method of claim 26, wherein the third heating stage has an second average ramp rate of greater than about 40° C./hour and less than about 50° C./hour.

28. The method of claim 14, wherein the step of holding the furnace temperature in the fourth heating stage is for at least 10 hours.

29. The method of claim 14, wherein the step of holding the furnace temperature in the fourth heating stage holding within a second hold temperature zone having a lower limit above 1420° C. and an upper limit below 1460° C. is for at least 15 hours.

30. The method of claim 14, wherein the first average ramp rate is, greater than an average heating rate of the second heating stage within a first hold temperature zone.

31. The method of claim 14, wherein the second average ramp rate in the third heating stage is greater than the average heating rate of the second heating stage.

32. The method of claim 14, wherein the step of holding includes maintaining the furnace temperature within the second hold temperature zone above 1350° C. and below 1550° C. for at least 10 hours.

33. The method of claim 14, wherein the ceramic article is formed with a predominant phase of aluminum titanate.

34. The method of claim 14, further comprising a step of increasing an oxygen concentration into the furnace to greater than 15% in less than 80 hours.

35. The method of claim 14, further comprising a step of increasing an oxygen concentration into the furnace to greater than 15% in less than 40 hours.

36. The method of claim 14, further comprising a step of increasing an oxygen concentration into the furnace to greater than 15% in less than 30 hours.

* * * * *